United States Patent
Lee et al.

(10) Patent No.: US 9,357,201 B2
(45) Date of Patent: May 31, 2016

(54) STEREOSCOPIC DISPLAY APPARATUS

(76) Inventors: Gyo Hyun Lee, Siheung-si (KR); Jong Oh Lee, Siheung-si (KR)

( * ) Notice: Subject to any disclaimer, the term of this patent is extended or adjusted under 35 U.S.C. 154(b) by 340 days.

(21) Appl. No.: 13/983,768

(22) PCT Filed: Feb. 2, 2012

(86) PCT No.: PCT/KR2012/000816
§ 371 (c)(1),
(2), (4) Date: Aug. 5, 2013

(87) PCT Pub. No.: WO2012/105818
PCT Pub. Date: Aug. 9, 2012

(65) Prior Publication Data
US 2013/0307943 A1 Nov. 21, 2013

(30) Foreign Application Priority Data

Feb. 6, 2011  (KR) .......................... 10-2011-0010402
May 30, 2011  (KR) .......................... 10-2011-0051159

(51) Int. Cl.
*H04N 13/02* (2006.01)
*G02B 27/22* (2006.01)
*G09G 3/00* (2006.01)
*H04N 13/04* (2006.01)

(52) U.S. Cl.
CPC ............ *H04N 13/02* (2013.01); *G02B 27/2214* (2013.01); *G09G 3/003* (2013.01); *H04N 13/0409* (2013.01); *H04N 13/0415* (2013.01)

(58) Field of Classification Search
None
See application file for complete search history.

(56) References Cited

U.S. PATENT DOCUMENTS

| 6,064,424 A | 5/2000 | van Berkel et al. |
| 2006/0126177 A1 | 6/2006 | Kim et al. |
| 2010/0073465 A1 | 3/2010 | Park et al. |

FOREIGN PATENT DOCUMENTS

| KR | 10-2005-0076946 | 7/2005 |
| KR | 10-0662429 | 12/2006 |
| KR | 10-0938481 | 1/2010 |
| KR | 10-0953747 | 4/2010 |
| KR | 10-2011-0014311 | 2/2011 |

OTHER PUBLICATIONS

International Search Report for PCT/KR2012/000816 mailed Sep. 27, 2012.

*Primary Examiner* — Sath V Perungavoor
*Assistant Examiner* — Janese Duley
(74) *Attorney, Agent, or Firm* — AKC Patents, LLC

(57) ABSTRACT

According to one embodiment of the present invention, a stereoscopic display apparatus comprises: a display panel in which a plurality of unit pixels is defined and which enables n views; and a parallax barrier disposed on one side of the display panel. n is an integer larger than 2, and p and 1 are divisors of said n. In said display panel, q unit pixels arranged adjacently to one other in rows constitute one unit row, and said n views are achieved by means of p unit rows arranged adjacently to one another in columns.

13 Claims, 7 Drawing Sheets

STEREOSCOPIC DISPLAY APPARATUS

RELATED APPLICATIONS

This application is a 371 application of International Application No. PCT/KR2012/000816, filed Feb. 2, 2012, which in turn claims priority from Korean Patent Application Nos. 10-2011-0051159, filed May 30, 2011, and 10-2011-0010402, filed Feb. 6, 2011, each of which is incorporated herein by reference in its entirety.

TECHNICAL FIELD

The present invention relates to a stereoscopic display apparatus.

BACKGROUND ART

Three-dimensional image display technology is technology in which a user enables a cubic effect to feel by binocular parallax in which a difference occurs between images of a left eye and a right eye. A method of viewing a three-dimensional image may be classified into a glass method and a glass-free method. The glass method has inconvenience in which a user should wear glasses, and it may be different to view subjects other than a stereoscopic image in a state in which the user wears glasses. Accordingly, a research for a glass-free method has been actively performed.

The glass-free method may be classified into a lenticular method using a cylindrical lens and a parallax barrier method using a light emitting unit and a light blocking unit. In the lenticular method, because a lens is used, a distortion problem of an image may occur. However, in the parallax barrier method, there is a merit that stereoscopic viewing is possible at several positions.

However, when embodying a stereoscopic image of multi-view using a parallax barrier method, a ratio of a light emitting unit is very low. That is, when the view number of the n number is embodied, a ratio of a light emitting unit to a light blocking unit becomes 1:(n−1) and thus a ratio of the light emitting unit is very low. In this way, when a ratio of the light emitting unit is lowered, a ratio of a portion that displays an image in a display device is reduced and thus a resolution may be deteriorated.

DISCLOSURE

Technical Problem

The present invention has been made in view of the above problems, and provides a stereoscopic display apparatus that can enhance luminance and a resolution even while embodying a multi-view.

Technical Solution

In accordance with an aspect of the present invention, a stereoscopic display apparatus includes: a display panel in which a plurality of unit pixels are defined and for embodying n views; and a parallax barrier disposed at an one surface of the display panel. The n is an integer of 2 or more, and p and q are divisors of the n. In the display panel, the q number of unit pixels adjacent in a row direction form one unit row, and the n views are embodied by the p number of unit rows adjacent in a column direction.

The n may be a multiple of 2 and the p may be 2, and the q number of unit pixels adjacent in the row direction may form a first unit row, and the q number of unit pixels adjacent in the column direction in the first unit row and adjacent in the row direction may form a second unit row. The n views may be embodied by the first unit row and the second unit row.

In the display panel, images of the odd number among images of the n views may be sequentially projected in the first unit row, and images of the even number among images of the n views may be sequentially projected in the second unit row.

In the display panel, the n number of unit pixels embodying the n views may be shifted to the right one by one by one unit pixel while advancing upward. In this case, in the display panel, in a downward row of the first and second unit rows, unit pixel images corresponding to the odd number may be sequentially projected from the right to the left, and in a upward row of the first and second unit rows, unit pixel images corresponding to the even number may be sequentially projected from the right to the left.

Alternatively, in the display panel, the n number of unit pixels embodying the n views may be shifted to the left one by one by one unit pixel while advancing upward. In this case, in the display panel, in a downward row of the first and second unit rows, unit pixel images corresponding to the even number are sequentially projected from the right to the left, and in a upward row of the first and second unit rows, unit pixel images corresponding to the odd number are sequentially projected from the right to the left.

The parallax barrier may have a plurality of light emitting units and a plurality of light blocking units corresponding to the plurality of unit pixels, respectively, and when a value that subtracts 1 from a value q in which the n is divided by a devisor p of the n is m, one unit pixel corresponding to the light emitting unit in a row direction and m unit pixels corresponding to the light blocking unit may be repeatedly disposed.

The light emitting unit may be formed in a diagonal direction of the display panel, and when a width of the unit pixel according to the row direction is A and a length of the unit pixel according to a column direction is B, a slope C of the light emitting unit may be represented by the following Equation.

$$0.95*\{(p*B)/A\} \leq C \leq 1.05*\{(p*B)/A\} \qquad \text{<Equation>}$$

The n may be an integer of 4 or more and be a multiple of 2, and the p may be 2.

The light emitting unit may be formed in a diagonal direction of the display panel, and a slope of the light emitting unit is 79° to 82°.

The light emitting unit may be formed in a diagonal direction of the display panel, and a boundary line of the light emitting unit may have an oblique form or a stair shape.

The parallax barrier may include: a transparent substrate including glass; and a barrier pattern formed on the transparent substrate.

Advantageous Effects

In a stereoscopic display apparatus according to an exemplary embodiment of the present invention, even when embodying a multi-view of the same n number, the stereoscopic display apparatus is driven to increase a light emitting unit ratio in the parallax barrier and thus luminance and a resolution can be improved. In this case, in order to embody n views, when using the n number of unit pixels, by enabling n to be a multiple of 2 and by disposing the n number of unit pixels at two rows, a horizontal line can be prevented from occurring in an image embodied in a display panel. Accordingly, a picture quality and luminance can be improved.

BEST MODES FOR CARRYING OUT THE INVENTION

Hereinafter, a parallax barrier and a stereoscopic display apparatus including the same according to an exemplary embodiment of the present invention will be described in detail with reference to the accompanying drawings.

Figure 1:
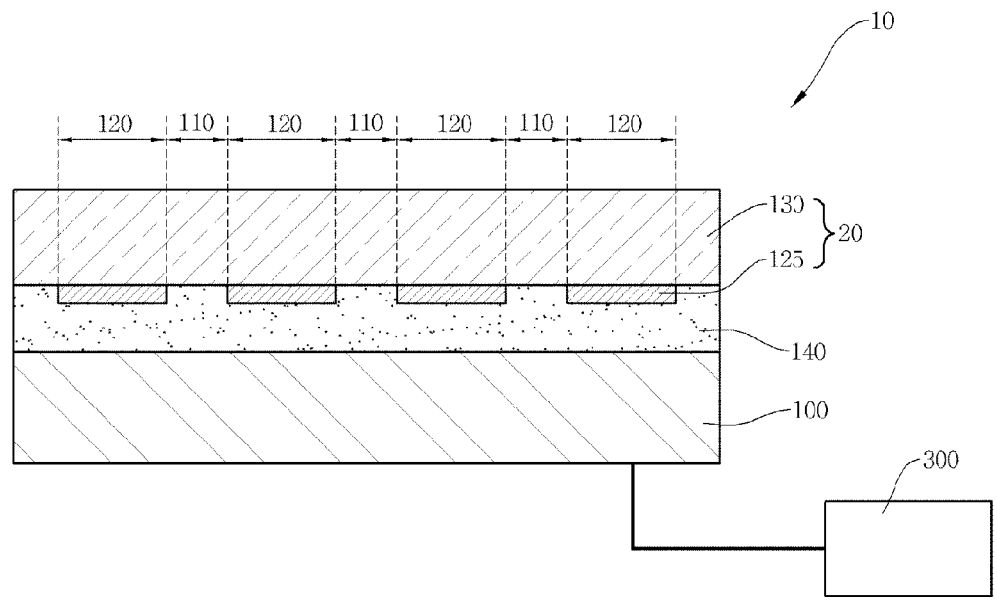
FIG. 1 is a cross-sectional view illustrating a stereoscopic display apparatus according to an exemplary embodiment of the present invention.
Figure 2:
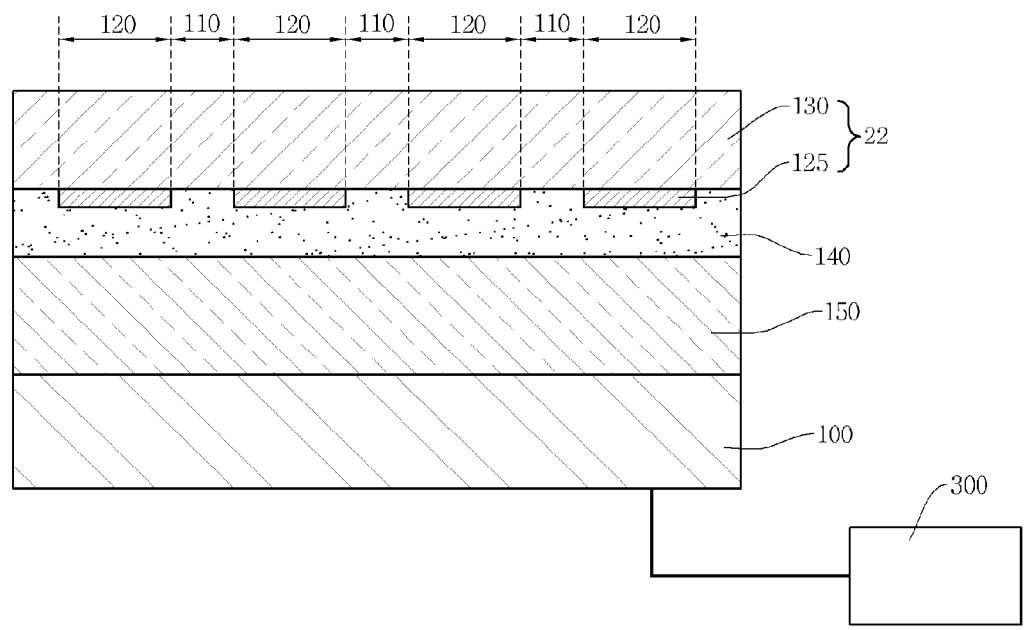
FIG. 2 is a cross-sectional view illustrating a stereoscopic display apparatus according to a modified example of the present invention.

FIG. 1 is a cross-sectional view illustrating a stereoscopic display apparatus according to an exemplary embodiment of the present invention, and FIG. 2 is a cross-sectional view illustrating a stereoscopic display apparatus according to a modified example of the present invention.

Referring to FIG. 1, a stereoscopic display apparatus 10 according to the present exemplary embodiment includes a display panel 100 in which a plurality of unit pixels (reference numeral 210 of FIG. 3) are defined and for embodying a multi-view, a driver 300 for controlling driving of the display panel 100, and a parallax barrier 20 disposed at one surface (accurately, a front surface) of the display panel 100.

For example, as the display panel 100, a display panel using a liquid crystal display (LCD), a plasma display panel (PDP), and a light emitting diode (LED) may be used. However, the present invention is not limited thereto, and the display panel 100 of various methods may be used.

In such a display panel 100, a plurality of unit pixels 210 are defined in each of a row direction and a column direction, and in the present exemplary embodiment, the display panel 100 embodies an image of a multi-view. Hereinafter, for convenience, it is assumed that the view number of the display panel 100 is n. Here, n is an integer of 2 or more.

The driver 300 controls driving of the display panel 100 and provides an image signal of a multi-view to the display panel 100, thereby embodying a three-dimensional image by a multi-view. In the present exemplary embodiment, the driver 300 is controlled to embody an image of a multi-view to the unit pixels 210 defined by a plurality of columns and a plurality of rows and this will be described in detail with reference to FIGS. 3 and 4. For reference, conventionally, in a plurality of columns of one row, an image of a multi-view was displayed.

The parallax barrier 20 positioned at a front surface of the display panel 100 selectively transmits an image of a multi-view and thus forms a parallax barrier so that both eyes of an observer may view different images. For this purpose, the parallax barrier 20 includes a plurality of light emitting units 110 and a plurality of light blocking units 120 corresponding to the unit pixels 210, respectively, of the display panel 100.

In more detail, as shown in FIG. 1, the parallax barrier 20 includes a transparent substrate 130 and a barrier pattern 125 formed on the transparent substrate 130.

Here, after applying and drying ultraviolet ray ink or thermosetting ink, by patterning ultraviolet ray ink or thermosetting ink, the barrier pattern 125 may be formed, but the present invention is not limited thereto. A portion in which the barrier pattern 125 is formed forms a light blocking unit 120, and a portion in which the barrier pattern 125 is not formed forms the light emitting unit 110. A two-dimensional disposition of the light blocking unit 120 and the light emitting unit 110 will be described later in detail with reference to FIGS. 3 and 4.

The transparent substrate 130 may be, for example, a glass substrate. When a glass substrate is used as the transparent substrate 130, the transparent substrate 130 has a high transmittance and a separate substrate may not be used. Therefore, an image embodied in the display panel 100 may be transmitted with a high transmittance without a problem such as distortion.

However, a conventional parallax barrier was used by laminating tempered glass using a patterned polymer film (e.g., polyethylene phthalate (PET) film) as an adhesive. In general, a transmittance of a polymer film and tempered glass is lower than that of general glass, and a conventional parallax barrier together using the polymer film and the tempered glass has a remarkably lower transmittance. Further, offset interference may occur by a refractive index difference of a polymer film, tempered glass, and an adhesive and thus a moiré phenomenon may occur.

In this way, in the present exemplary embodiment, by forming the transparent substrate 130 with a glass substrate, the transparent substrate 130 may have a high transmittance without image distortion. However, the present invention is not limited to a material of the transparent substrate 130 and various materials may be used as the transparent substrate 130.

Such a parallax barrier 20 is attached and fixed to a front surface of the display panel 100 by a bonding layer 140. Various materials may be used as the bonding layer 140, and for example, a material such as an ultraviolet adhesive, a visible light adhesive, an infrared adhesive, and a heat adhesive may be used.

It is preferable that such a bonding layer 140 has a refractive index similar to that of the transparent substrate 130, and thus minimizes moiré and prevents Newton ring from occurring. For example, when the transparent substrate 130 is formed with a glass substrate, the bonding layer 140 may have a refractive index of about 1.48-1.54 similar to that of a glass substrate.

FIG. 1 illustrates that the parallax barrier 20 is formed with the transparent substrate 130 and the barrier pattern 125 formed on the transparent substrate 130. However, the present invention is not limited thereto.

Therefore, in a modified example, as shown in FIG. 2, a parallax barrier 22 includes a transparent substrate 130, a barrier pattern 125, a bonding layer 140 formed on the transparent substrate 130 and the barrier pattern 125, and a separate transparent substrate 150 bonded by the bonding layer 140. The above-described separate transparent substrate 150 may include the same material as that of the transparent substrate 130. In the present modified example, the parallax barrier 22 and the display panel 100 may be coupled by a bonding layer (not shown) or a fixed member (not shown). In addition, a parallax barrier having various sectional structures may be used.

A plane structure of the above-described parallax barrier 20 and a method of driving the display panel 100 in which the parallax barrier 20 is used will be described in detail with reference to FIG. 3.

Figure 3:
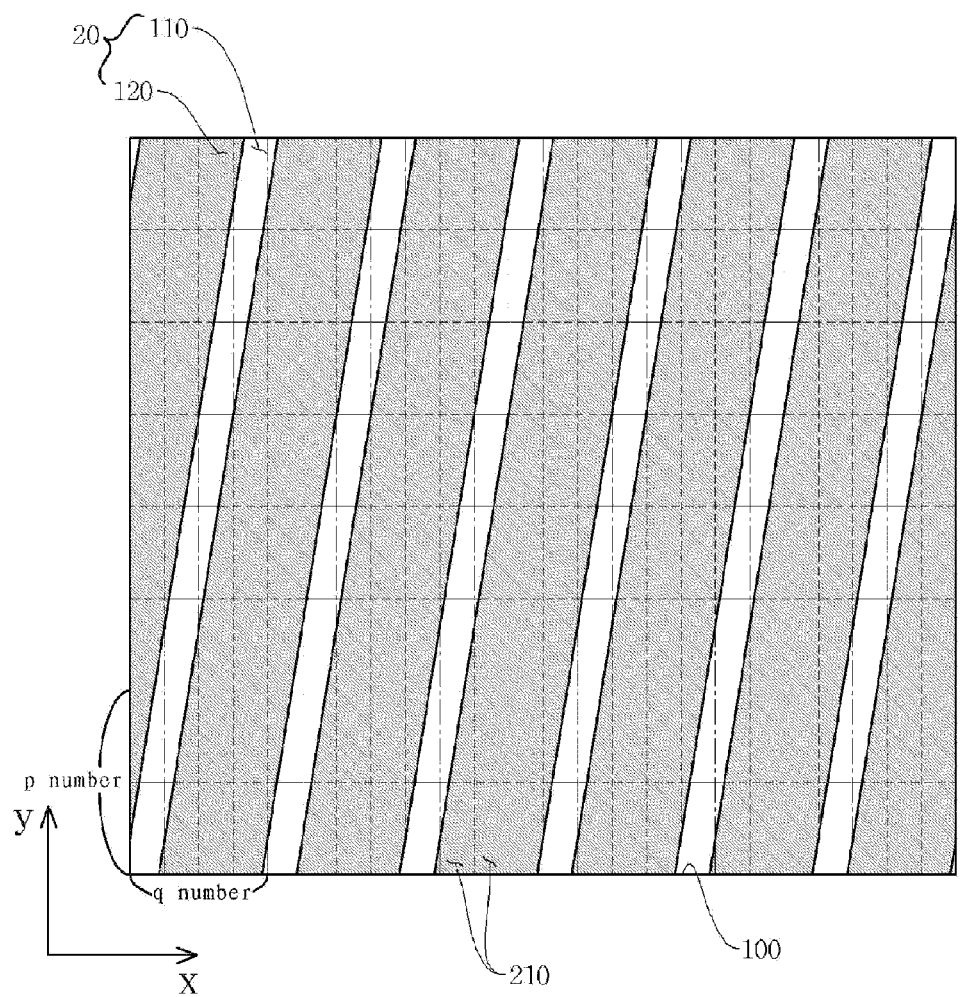
FIG. 3 is a top plan view illustrating unit pixels of a display panel and a light blocking unit and a light emitting unit of a parallax barrier corresponding thereto according to an exemplary embodiment of the present invention.
Figure 4:
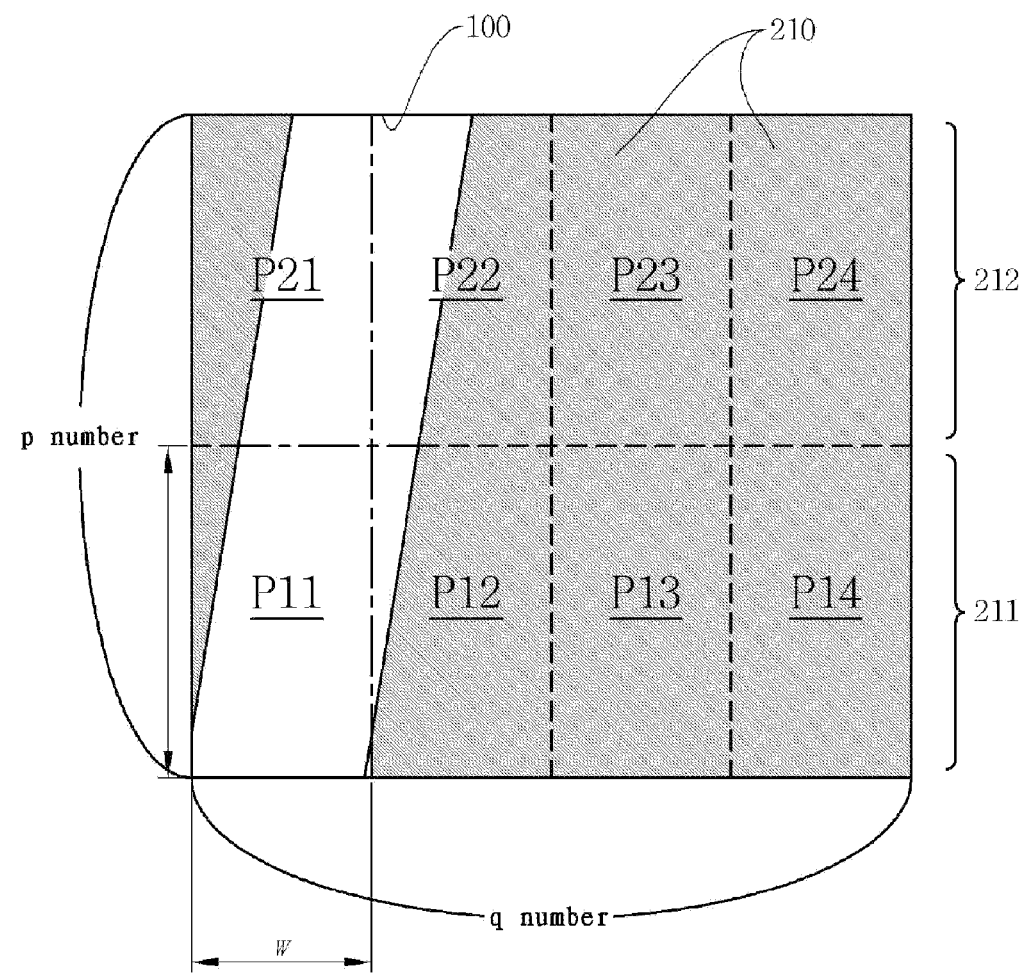
FIG. 4 is a top plan view illustrating unit pixels for embodying a multi-view in a display panel and a light blocking unit and a light emitting unit of a parallax barrier corresponding thereto according to an exemplary embodiment of the present invention.

FIG. 3 is a top plan view illustrating unit pixels of a display panel and a light blocking unit and a light emitting unit of a parallax barrier corresponding thereto according to an exemplary embodiment of the present invention, and FIG. 4 is a top plan view illustrating unit pixels for embodying a multi-view in a display panel and a light blocking unit and a light emitting unit of a parallax barrier corresponding thereto according to an exemplary embodiment of the present invention.

Referring to the drawings, in the present exemplary embodiment, in the display panel 100, a plurality of unit pixels 210 are defined. More specifically, a plurality of unit pixels 210 are disposed while having a plurality of columns in a row direction (x-axis direction of the drawing) and having a plurality of rows in a column direction (y-axis direction of the drawing). Such unit pixels 210 include red color pixels that emit red color light, green color pixels that emit green color light, and blue color pixels that emit blue color light. For example, one red color pixel, one green color pixel, and one blue color pixel adjacent in a row direction may display an image by forming one pixel, but the present invention is not limited thereto. Therefore, by including a color other than a red color, a green color, and a blue color, the unit pixel 210 forms one pixel and may be variously deformed.

In the display panel 100 of the present exemplary embodiment, when displaying an image having the view number of the n number, n views are not embodied in unit pixels 120 of one row or one column and are displayed in unit pixels 120 of a plurality of rows and a plurality of columns.

More specifically, unit pixels of the q number adjacent in a row direction form one unit row. N views are embodied by the unit pixels 210, i.e., unit pixels of the p number*the q number shown in FIG. 4 positioned at unit rows of the p number adjacent in a column direction. Here, n is an integer of 2 or more, p and q are divisors of n, and the produce of p and q becomes n. More accurately, n views are embodied using the unit pixels 210 positioned by a plurality of columns and a plurality of rows, and at least two rows and two columns should be provided and thus n is an integer of 4 or more.

For example, in FIGS. 3 and 4, the 8 view number are embodied using two of a unit row formed with adjacent four unit pixels in a row direction. That is, when using two of a unit row formed with adjacent 4 unit pixels in a row direction, total 8 unit pixels are formed and thus 8 views are embodied. Here, q becomes four, and p becomes 2. In the drawings, for example, the 8 view number is illustrated, but the present invention is not limited thereto. Therefore, the present invention may have various values of n, p, and q.

Here, n may be a multiple of 2, and p may be 2. Therefore, n views may be embodied with a first unit row (hereinafter, "odd number row") 211 including unit pixels of the q number adjacent in a row direction and a second unit row (hereinafter, "even number row") 212 adjacent to the odd number row and including unit pixels of the q number adjacent in a row direction. Thereby, by diffraction of light, a phenomenon in which a horizontal line occurs in an image embodied in the display panel 100 can be prevented.

More specifically, when n is the odd number, p and q are also the odd number, and in this case, due to diffraction of light, a horizontal line may occur in an image embodied in the display panel 100. When n is a multiple of 3, such a phenomenon may more remarkably occur.

For example, when 9 views are embodied with unit pixels of 3 columns and 3 rows, a horizontal line may occur. In consideration of this, in the present invention, by forming n in a multiple of 2 and forming p in 2, a horizontal line is minimized from occurring. Further, it is preferable that all of n, p, and q are not a multiple of 3.

Figure 5:
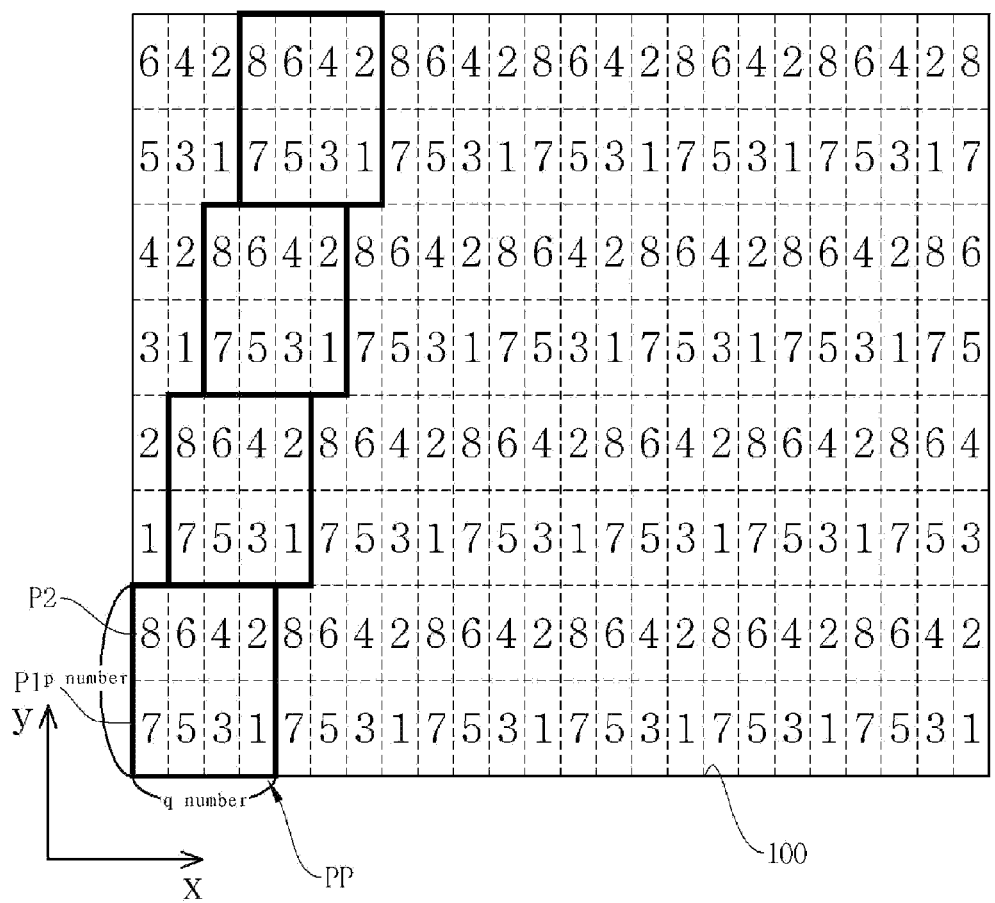
FIG. 5 is a diagram illustrating image distribution in a display panel according to an exemplary embodiment of the present invention.

In this case, the driver (reference numeral 300 of FIG. 1), a unit pixel image corresponding to the odd number among n views is sequentially positioned at the first unit row 211, and a unit pixel image corresponding to the even number among n views is sequentially projected to the second unit row 212. That is, in a case of 8 views, for example, a first image is projected to a fourteenth unit pixel P14 of the first unit row 211, a third image is projected to a thirteenth unit pixel P13, a fifth image is projected to a twelfth image p12, a seventh image is projected to an eleventh image p11, and a second image is projected to a twenty-fourth unit pixel P24 of the second unit row 212, a fourth image is projected to a twenty-third unit pixel P23, a sixth image is projected to a twenty-second unit pixel P22, and an eighth image is projected to a twenty-first unit pixel P21. More specifically, an image projected from the entire display panel 100 will be described as follows. FIG. 5 is a diagram illustrating image distribution in a display panel according to an exemplary embodiment of the present invention. Referring to FIG. 5, 8 unit pixels PP for embodying n views may have an oblique form shifted to the right by one unit pixel while advancing upward. In this case, in first and second unit rows constituting 8 unit pixels PP, in a unit row P1 positioned at a lower portion, first, third, fifth, and seventh images are positioned from the right to the left, and in a unit row P2 positioned at an upper portion, second, fourth, sixth, and eighth images are positioned from the right to the left.

Figure 6:
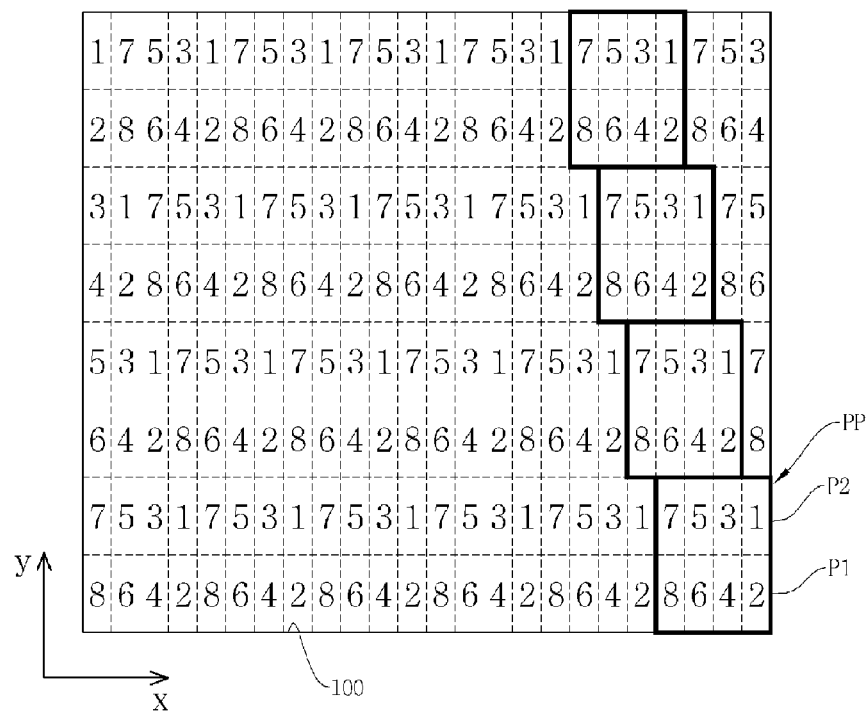
FIG. 6 is a diagram illustrating image distribution in a display panel according to an exemplary embodiment of the present invention.

However, the present invention is not limited thereto, and as shown in FIG. 6, 8 unit pixels PP for embodying n views may have an oblique form shifted to the left by one unit pixel while advancing upward. In this case, in first and second unit rows constituting 8 unit pixels PP, in a unit row P1 positioned at a lower portion, second, fourth, sixth, and eighth images are positioned from the right to the left, and in a unit row P2 positioned at an upper portion, first, third, fifth, and seventh images are positioned from the right to the left.

In the parallax barrier 20 used for such a display panel 100, when viewing in a row direction, one unit pixel corresponding to the light emitting unit 110 and unit pixels of the m number corresponding to the light blocking unit 120 are repeatedly disposed. Here, m is the number that subtracts 1 from q. In this way, when n views are embodied with columns of the q number and rows of the p number, a ratio of the light emitting unit 110 to the light blocking unit 120 is 1:m (i.e., 1:(q−1))

and thus a ratio of the light blocking unit 120 may be decreased and a ratio of the light emitting unit 110 may be increased. In this way, by increasing a ratio of the light emitting unit 110, there is a merit that luminance and a resolution may be increased.

Figure 7:
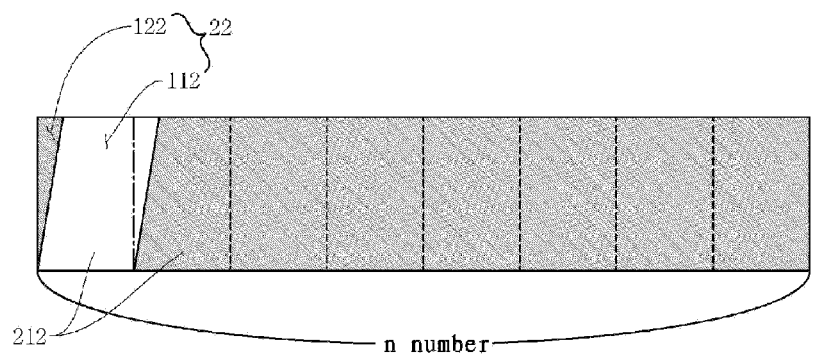
FIG. 7 is a top plan view illustrating unit pixels of a conventional display panel and a light blocking unit and a light emitting unit of a conventional parallax barrier corresponding thereto.

For more clear description, this will be described with reference to FIGS. 4 and 7. FIG. 7 is a top plan view illustrating unit pixels for embodying a multi-view in a conventional display panel and a light blocking unit and a light emitting unit of a conventional parallax barrier corresponding thereto.

In the present exemplary embodiment, as shown in FIG. 4, when n is 8, p is 2, and q is 4, when viewing in a row direction from the parallax barrier 20, a ratio of the light emitting unit 110 to the light blocking unit 120 is 1:3. That is, when embodying 8 views, in the parallax barrier 20, a ratio of the light emitting unit 110 to the light blocking unit 120 is 1:3.

However, as shown in FIG. 7, conventionally, in order to embody n views, images of the n number are displayed in adjacent unit pixels 212 of the n number in one row, and when viewing in a row direction from a parallax barrier 22, a ratio of a light emitting unit 112 to a light blocking unit 122 is 1:(n−1). For example, when embodying 8 views, in the parallax barrier 22, a ratio of the light emitting unit 112 to the light blocking unit 122 is 1:7.

Therefore, in the present exemplary embodiment, even while embodying a multi-view of the same number, a ratio of the light emitting unit 110 in the parallax barrier 20 can be enhanced and thus luminance and a resolution can be increased to correspond thereto. For example, as described above, when n is a multiple of 2 and p is 2, luminance and a resolution can be increased by the double or more.

In the drawing, for briefly describing, it is illustrated that the light emitting unit 110 and a unit pixel 210 have the same size, but the present invention is not limited thereto. Actually, a size of the light emitting unit 110 corresponding to each unit pixel 210 may be smaller than that of each unit pixel 210.

When the number of views is large rather than when the number of views is small, a size ratio of the light emitting unit 110 may be relatively large. This is designed so that a wavelength of light passes to one unit pixel 210 with the constant number of times, and thus an interference phenomenon is minimized, and therefore a moiré phenomenon is minimized. In consideration of a process error together with this, a width ratio of the light emitting unit 110 to the light blocking unit 120 may be 0.95: (m+0.05) to 1.33: (m−1.33). More preferably, a width ratio of the light emitting unit 110 to the light blocking unit 120 may be 0.95: (m+0.05) to 1.2: (m−1.2).

In the present exemplary embodiment, as the light emitting unit 110 is formed in a diagonal direction of the display panel 100, a multi-view image can be softly expressed. In this case, as described above, the parallex barrier 20 of the present exemplary embodiment excellently enables a transmittance and a refractive index characteristic and thus a moiré phenomenon can be effectively prevented from occurring.

In this case, as described above, when a multi-view is embodied in unit pixels positioned at rows of the p number and columns of the q number, a slope of the light emitting unit 110 is larger than that of the conventional light emitting unit 112. That is, when a width w of a unit pixel according to a row direction is A and a length l of a unit pixel according to a column direction is B, a slope C of the light emitting unit 110 is theoretically represented by Equation 1.

$$C=(p*B)/A \qquad \text{<Equation 1>}$$

Actually, when it is considered that an error may exist, a slope C of the light emitting unit 110 is represented by Equation 2.

$$0.95*\{(p*B)/A\} \leq C \leq 1.05*\{(p*B)/A\} \qquad \text{<Equation 2>}$$

In consideration of a length l and a width w of a commonly using unit pixel, a slope of the light emitting unit 110 may be 79° to 82°.

However, as shown in FIG. 7, in the conventional art in which unit pixels for embodying n views are positioned at one row, a slope of the light emitting unit 112 is a value obtained by dividing B by A. Therefore, a slope of the light emitting unit 112 of the conventional art is much smaller than that of the light emitting unit 110 of the present exemplary embodiment. In this way, in the present exemplary embodiment, by enabling a slope of the light emitting unit 110 to be larger than that of the conventional art, a ratio of the light emitting unit 110 may be relatively increased.

Figure 8:
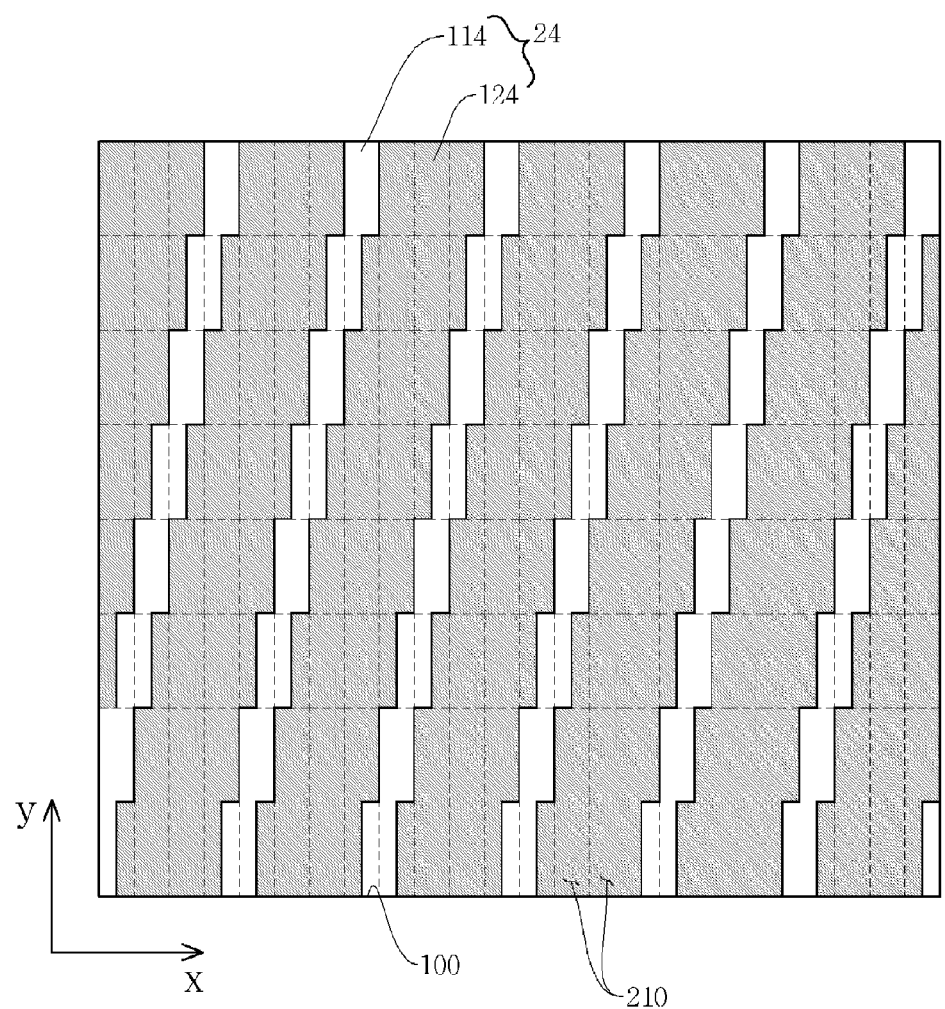
FIG. 8 is a top plan view illustrating unit pixels for embodying a multi-view in a display panel and a light blocking unit and a light emitting unit of a parallax barrier corresponding thereto according to another exemplary embodiment of the present invention.

In the above-described description and drawings, it was illustrated that a boundary line of the light emitting unit 110 has an oblique form. However, the present invention is not limited thereto and as shown in FIG. 8, in a parallax barrier 24, at least a portion of a boundary line of a light blocking unit 124 and a light emitting unit 114 may be formed in a diagonal direction of the display panel 100 while having a stair shape following a boundary of the unit pixels 210. In more detail, in one row, a boundary line of the light emitting unit 114 substantially corresponds with a boundary line of the unit pixels 210, and in another row adjacent thereto, a boundary line of the light emitting unit 114 substantially corresponds with a virtual center line of the unit pixels 210. A boundary of a multi-view image is cleared by the light emitting unit 114 having such a shape and thus a clear image can be embodied.

The present invention is not limited thereto and a light emitting unit of various shapes may be formed.

Figure 9:
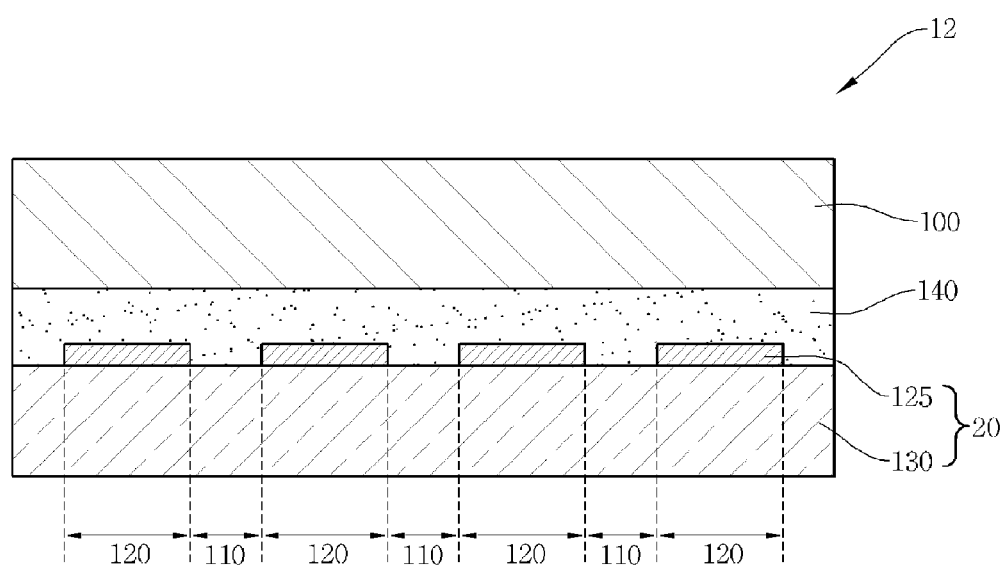
FIG. 9 is a cross-sectional view illustrating a stereoscopic display apparatus according to another exemplary embodiment of the present invention.

Further, in a passive light emitting stereoscopic display apparatus 12 using a backlight unit (not shown), a parallax barrier 20 may be positioned at a rear surface of a display panel 100, as shown in FIG. 9. In this case, a width of a light emitting unit 110 of the parallax barrier 20 may be formed larger than that of a unit pixel. Thereby, because a barrier line may not be seen to a user, the user's negative feeling that may occur by the barrier line may be removed.

The above-described characteristics, structures, and effects are included in at least an exemplary embodiment of the present invention and are not limited only to one exemplary embodiment. Furthermore, characteristics, structures, and effects illustrated in each exemplary embodiment may be combined or deformed, and performed in other exemplary embodiments by a person of ordinary skill in the art to which exemplary embodiments belong. Therefore, it should be analyzed that contents related to such a combination and deformation are included in the scope of the present invention.

The invention claimed is:
1. A stereoscopic display apparatus, comprising:
   a display panel in which a plurality of unit pixels are defined and for embodying n views; and
   a parallax barrier disposed at an one surface of the display panel,
   wherein when the n is an integer of 2 or more and when p and q are divisors of the n, in the display panel, the q number of unit pixels adjacent in a row direction form one unit row, and the n views are embodied by the p number of unit rows adjacent in a column direction.
2. The stereoscopic display apparatus of claim 1, wherein the n is a multiple of 2 and the p is 2, and the q number of unit pixels adjacent in the row direction form a first unit row, and the q number of unit pixels adjacent in the column direction in the first unit row and adjacent in the row direction form a second unit row, and the n views are embodied by the first unit row and the second unit row.

3. The stereoscopic display apparatus of claim 2, wherein in the display panel, a unit pixel image corresponding to the odd number among images of the n views is sequentially projected in the first unit row, and a unit pixel image corresponding to the even number among images of the n views is sequentially projected in the second unit row.

4. The stereoscopic display apparatus of claim 3, wherein in the display panel, the n number of unit pixels embodying the n views are shifted to the right one by one by one unit pixel while advancing upward.

5. The stereoscopic display apparatus of claim 3, wherein in the display panel, in a downward row of the first and second unit rows, unit pixel images corresponding to the odd number are sequentially projected from the right to the left, and in a upward row of the first and second unit rows, unit pixel images corresponding to the even number are sequentially projected from the right to the left.

6. The stereoscopic display apparatus of claim 3, wherein in the display panel, the n number of unit pixels embodying the n views are shifted to the left one by one by one unit pixel while advancing upward.

7. The stereoscopic display apparatus of claim 6, wherein in the display panel, in a downward row of the first and second unit rows, unit pixel images corresponding to the even number are sequentially projected from the right to the left, and in a upward row of the first and second unit rows, unit pixel images corresponding to the odd number are sequentially projected from the right to the left.

8. The stereoscopic display apparatus of claim 1, wherein the parallax barrier has a plurality of light emitting units and a plurality of light blocking units corresponding to the plurality of unit pixels, respectively, and when a value that subtracts 1 from a value q in which the n is divided by a devisor p of the n is m, one unit pixel corresponding to the light emitting unit in a row direction and m unit pixels corresponding to the light blocking unit are repeatedly disposed.

9. The stereoscopic display apparatus of claim 8, wherein the light emitting unit is formed in a diagonal direction of the display panel, and when a width of the unit pixel according to the row direction is A and a length of the unit pixel according to a column direction is B, a slope C of the light emitting unit is represented by the following Equation <Equation> $0.95*\{(p*B)/A\} \leq C \leq 1.05*\{(p*B)/A\}$.

10. The stereoscopic display apparatus of claim 8, wherein the n is an integer of 4 or more and is a multiple of 2, and the p is 2.

11. The stereoscopic display apparatus of claim 10, wherein the light emitting unit is formed in a diagonal direction of the display panel, and a slope of the light emitting unit is 79° to 82°.

12. The stereoscopic display apparatus of claim 8, wherein the light emitting unit is formed in a diagonal direction of the display panel, and a boundary line of the light emitting unit has an oblique form or a stair shape.

13. The stereoscopic display apparatus of claim 8, wherein the parallax barrier comprises:
a transparent substrate comprising glass; and
a barrier pattern formed on the transparent substrate.

* * * * *